US011694090B2

(12) United States Patent
Aralikatte et al.

(10) Patent No.: US 11,694,090 B2
(45) Date of Patent: Jul. 4, 2023

(54) DEBUGGING DEEP NEURAL NETWORKS

(71) Applicant: INTERNATIONAL BUSINESS MACHINES CORPORATION, Armonk, NY (US)

(72) Inventors: Rahul Aralikatte, Bangalore (IN); Srikanth Govindaraj Tamilselvam, Chennai (IN); Shreya Khare, Bangalore (IN); Naveen Panwar, Bangalore (IN); Anush Sankaran, Bangalore (IN); Senthil Kumar Kumarasamy Mani, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1120 days.

(21) Appl. No.: 16/380,437

(22) Filed: Apr. 10, 2019

(65) Prior Publication Data
US 2020/0327420 A1    Oct. 15, 2020

(51) Int. Cl.
*G06N 3/02*    (2006.01)
*G06N 3/10*    (2006.01)
(Continued)

(52) U.S. Cl.
CPC .......... *G06N 3/10* (2013.01); *G06F 11/3624* (2013.01); *G06N 3/04* (2013.01); *G06N 3/08* (2013.01)

(58) Field of Classification Search
CPC ................ G06N 3/04–049; G06N 3/10; G06F 11/36–3664
(Continued)

(56) References Cited

U.S. PATENT DOCUMENTS 9,558,442 B2    1/2017    Canoy et al.
9,710,749 B2    7/2017    Canoy et al.
(Continued)

FOREIGN PATENT DOCUMENTS

CN    111814951 A    10/2020
WO    2017132584 A1    8/2017

OTHER PUBLICATIONS

Kulesza et al. "Principles of Explanatory Debugging to Personalize Interactive Machine Learning", IUI '15: Proceedings of the 20th International Conference on Intelligent User Interfaces.*
(Continued)

*Primary Examiner* — Jue Louie
(74) *Attorney, Agent, or Firm* — Steven M. Bouknight

(57) ABSTRACT

A method, computer system, and a computer program product for debugging a deep neural network is provided. The present invention may include identifying, automatically, one or more debug layers associated with a deep learning (DL) model design/code, wherein the identified one or more debug layers include one or more errors, wherein a reverse operation is introduced for the identified one or more debug layers. The present invention may then include presenting, to a user, a debug output based on at least one break condition, wherein in response to determining the at least one break condition is satisfied, triggering the debug output to be presented to the user, wherein the presented debug output includes a fix for the identified one or more debug layers in the DL model design/code and at least one actionable insight.

20 Claims, 5 Drawing Sheets

(51) Int. Cl.
G06N 3/04 (2023.01)
G06N 3/08 (2023.01)
G06F 11/36 (2006.01)

(58) Field of Classification Search
USPC .................. 706/12, 15–21; 717/124–135
See application file for complete search history.

(56) References Cited

U.S. PATENT DOCUMENTS

| | | | |
|---|---|---|---|
| 10,810,491 B1 * | 10/2020 | Xia | G06N 3/08 |
| 11,467,946 B1 * | 10/2022 | Jacob | G06N 3/10 |
| 2004/0168155 A1 * | 8/2004 | O'Farrell | G06F 11/3664 |
| | | | 714/E11.21 |
| 2020/0151088 A1 * | 5/2020 | Gu | G06F 5/06 |

OTHER PUBLICATIONS

Cai et al. "TensorFlow Debugger: Debugging Dataflow Graphs for Machine Learning", 2016, 30th Conference on Neural Information Processing Systems.*

Krishnan et al. "PALM: Machine Learning Explanations for Iterative Debugging", HILDA'17: Proceedings of the 2nd Workshop on Human-In-the-Loop Data Analytics.*

Ma et al. "MODE: Automated Neural Network Model Debugging via State Differential Analysis and Input Selection", 2018, Proceedings of the 2018 26th ACM Joint Meeting on European Software Engineering Conference and Symposium on the Foundations of Software Engineering.*

Krakovna et al., "Increasing the Interpretability of Recurrent Neural Networks Using Hidden Markov Models," ICML Workshop on Human Interpretability in Machine Learning (WHI 2016), 2016, p. 46-50, New York, NY, USA.

Mell et al., "The NIST Definition of Cloud Computing," National Institute of Standards and Technology, Sep. 2011, p. 1-3, Special Publication 800-145.

Noh et al., "Learning Deconvolution Network for Semantic Segmentation," IEEE International Conference on Computer Vision, 2015, p. 1520-1528, IEEE Computer Society.

Ribeiro et al., ""Why Should I Trust You?" Explaining the Predictions of Any Classifier," Proceedings of the 22nd ACM SIGKDD International Conference on Knowledge Discovery and Data Mining (KDD '16), 2016, p. 1135-1144, ACM, San Francisco, CA, USA.

Tensorflow, "TensorBoard: Visualizing Learning," TensorFlow Core Tutorials, p. 1-9, https://www.tensorflow.org/guide/summaries_and_tensorboard, Accessed on Apr. 9, 2019.

* cited by examiner

DEBUGGING DEEP NEURAL NETWORKS

BACKGROUND

The present invention relates generally to the field of computing, and more particularly to general programming integrated development environments (IDEs).

Deep neural networks have become ubiquitous in computer vision and image processing, natural language processing (NLP) and speech tasks. Though deep neural networks may outperform most other problem-solving techniques, training deep neural networks may be considered a difficult process that increases non-linearly in difficulty for inexperienced users. Factors, such as weight initialization, learning rate and momentum, may greatly affect the training process in which even a small glitch in defining any of these hyper-parameters may result in the network learning sub-optimal weights.

SUMMARY

Embodiments of the present invention disclose a method, computer system, and a computer program product for debugging a deep neural network. The present invention may include identifying, automatically, one or more debug layers associated with a deep learning (DL) model design/code, wherein the identified one or more debug layers include one or more errors, wherein a reverse operation is introduced for the identified one or more debug layers. The present invention may then include presenting, to a user, a debug output based on at least one break condition, wherein in response to determining the at least one break condition is satisfied, triggering the debug output to be presented to the user, wherein the presented debug output includes a fix for the identified one or more debug layers in the DL model design/code and at least one actionable insight.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
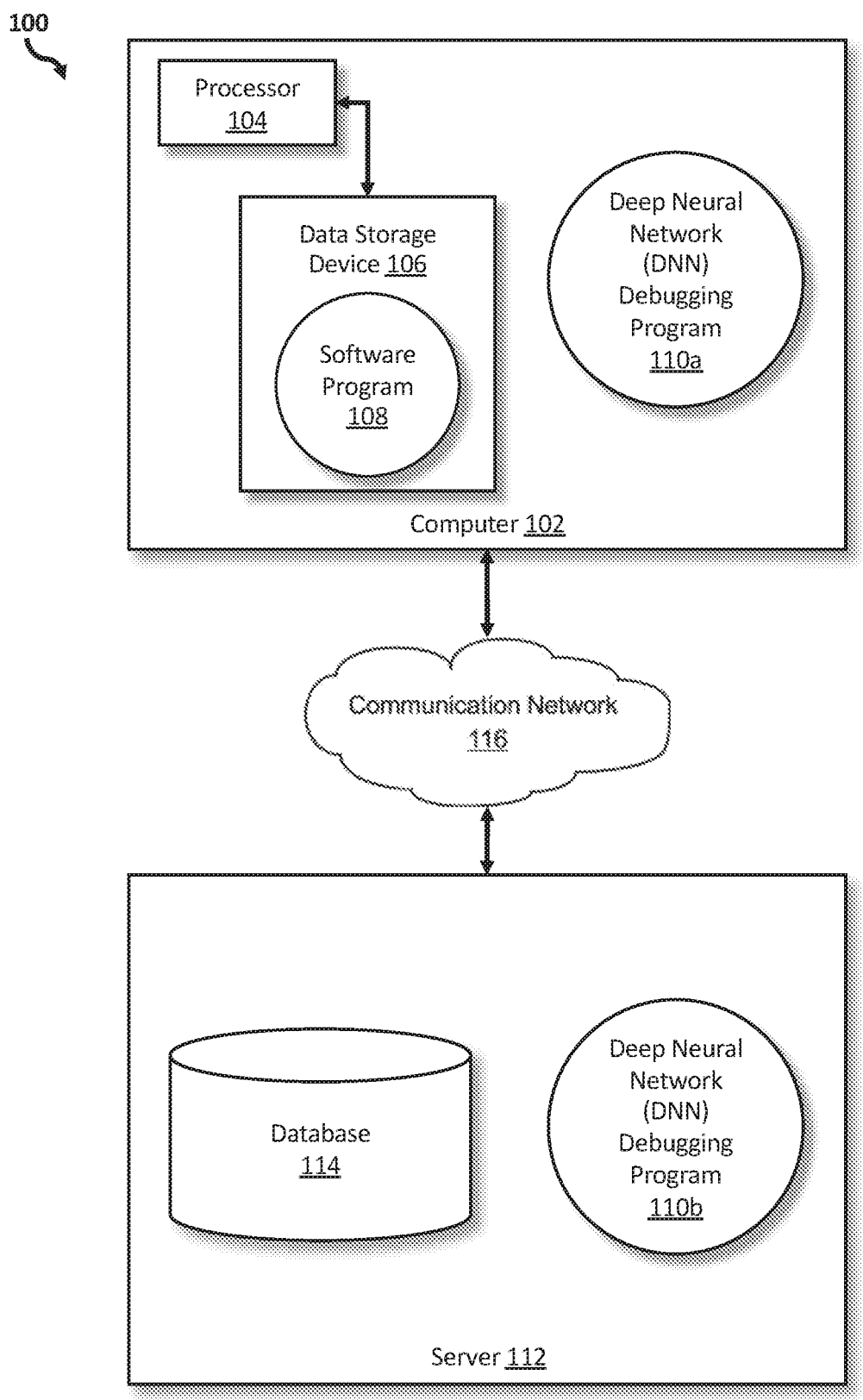
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for debugging a deep neural network. As such, the present embodiment has the capacity to improve the technical field of general programming integrated development environments (IDEs) by identifying layers of a deep learning model design or code (i.e., DL model design/code) for debugging, connecting the appropriate debug block(s) to the layers to be debugged, and applying a fix and/or providing insights to the user. More specifically, the present embodiment may include determining and introducing one or more reverse operation layers, automatically identifying debug layer(s), automatically creating a debug set by considering the nature of the neural network and/or dataset, automatically identifying suitable debug points, and presenting a fix and/or actionable insights to a user.

As previously described, deep neural networks have become ubiquitous in computer vision and image processing, natural language processing (NLP) and speech tasks. Though deep neural networks may outperform most other problem-solving techniques, training deep neural networks may be considered a difficult process that increases non-linearly in difficulty for inexperienced users. Factors, such as weight initialization, learning rate and momentum, may greatly affect the training process in which even a small glitch in defining any of these hyper-parameters may result in the network learning sub-optimal weights.

In general programming IDEs, a software application may apply breakpoints, watch interesting variables and observe the call stack (i.e., stack data structure that may store information in connection to the active subroutines of a computer program). The code may be dynamically instrumented for some additional tasks to be performed, when some pre-defined condition is satisfied. Though these features may also be available while writing code for neural networks, there may be a need for a higher level of debugging.

Therefore, it may be advantageous to, among other things, assist with successfully debugging the training process to ensure that the training process is proceeding in the right direction.

According to at least one embodiment, the deep neural network (DNN) debugging program may include the determining and introducing of one or more reverse operation layers for debugging, automatically identifying debug layer(s), automatically creating a debug set by considering the nature of the network/dataset, automatically identifying suitable debug points, and providing actionable insights to user.

According to at least one embodiment, the DNN debugging program may determine the one or more reverse operations based on heuristics defined, or a lookup table populated, from deep learning literature. For example, a convolutional layer has a reverse operation, such as a deconvolutional layer, and the pooling layer has a reverse operation, such as an upsampling layer.

According to at least one embodiment, the DNN debugging program may automatically create a debug set by considering the nature of the network. The DNN debugging program may utilize the debug points to indicate when and where the debugging should be performed. The debug points may be activated based on the break conditions that may be defined using different parameters, such as validation accuracy and the number of epochs. The break conditions may be set by the user upfront as constraints. In addition, the DNN debugging program may set debug points automatically on a particular layer based on a differential analysis.

According to at least one embodiment, the DNN debugging program may be utilized to train an image classifier by using a convolutional neural network (CNN). The DNN debugging program may set the debug flag to an active mode (e.g., "ON") before commencing the training, and may then select layer(s) to be watched. The DNN debugging program may then select a subset of the training data as a debug set that may be used while debugging the DNN by randomly partitioning the data, or clustering the training data and picking representational points for each cluster. The DNN debugging program may further define a break condition, which, when satisfied, may show the debugging results, by choosing an epoch breakpoint (e.g., debugging results may be shown after every "e" epochs), or choosing a validation accuracy, which, when crossed, triggers the debug outputs. The DNN debugging program may then start the training process. The present embodiment may include the DNN debugging program automatically, or via user control, selecting layer(s) to be watched, selecting a subset of the training data, and defining a break condition.

According to at least one embodiment, the DNN debugging program may check if the training process has commenced in debug mode. If the training process has started in debug mode, then the DNN debugging program may connect a debug block to each layer which is to be debugged (e.g., debug blocks or layers may differ depending on the recommended layer for debugging). A debug block may be considered a reverse engineering layer (e.g., layer 1), and may start training the enhanced/decorated network with data (e.g., training-debug data). Then, when the break condition is satisfied, the DNN debugging program may utilize the debug data to present to the user what occurred on the observed layer(s).

According at least one embodiment, the user may preclude the "debug mode," thereby removing the debug blocks for the training to continue on the original deep neural network. In the present embodiment, the "debug mode" may slow down the training process because of the addition of extra "debug" layers or blocks. As such, a user may choose to deactivate (i.e., turn "off" or place in inactive mode) the "debug mode," in the interest of time in the short-term and risk the presence of glitches in the design/code.

According to at least one embodiment, the DNN debugging program may include debugging for non-standard tasks that present a greater level of difficulty in identifying layers to debug based on past experience as the dataset, network or both. Therefore, the DNN debugging program may utilize a debug set to train the model. The DNN debugging program may then try to correlate the weights of the model learned from the debug set to the weights learned on the complete training data. If the correlation between the weights of a layer decreases, then the layer may be a potential layer for debugging. In the present embodiment, the DNN debugging program may also include debugging for standard tasks in which the DNN debugging program may automatically determine which layers to debug based on data in a knowledge base.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a DNN debugging program 110a. The networked computer environment 100 may also include a server 112 that is enabled to run a DNN debugging program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the DNN debugging program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the DNN debugging program 110a, 110b (respectively) to debug deep neural networks (DNN) prior to commencing the training process for the DNN. The DNN debugging method is explained in more detail below with respect to FIG. 2.

Figure 2:
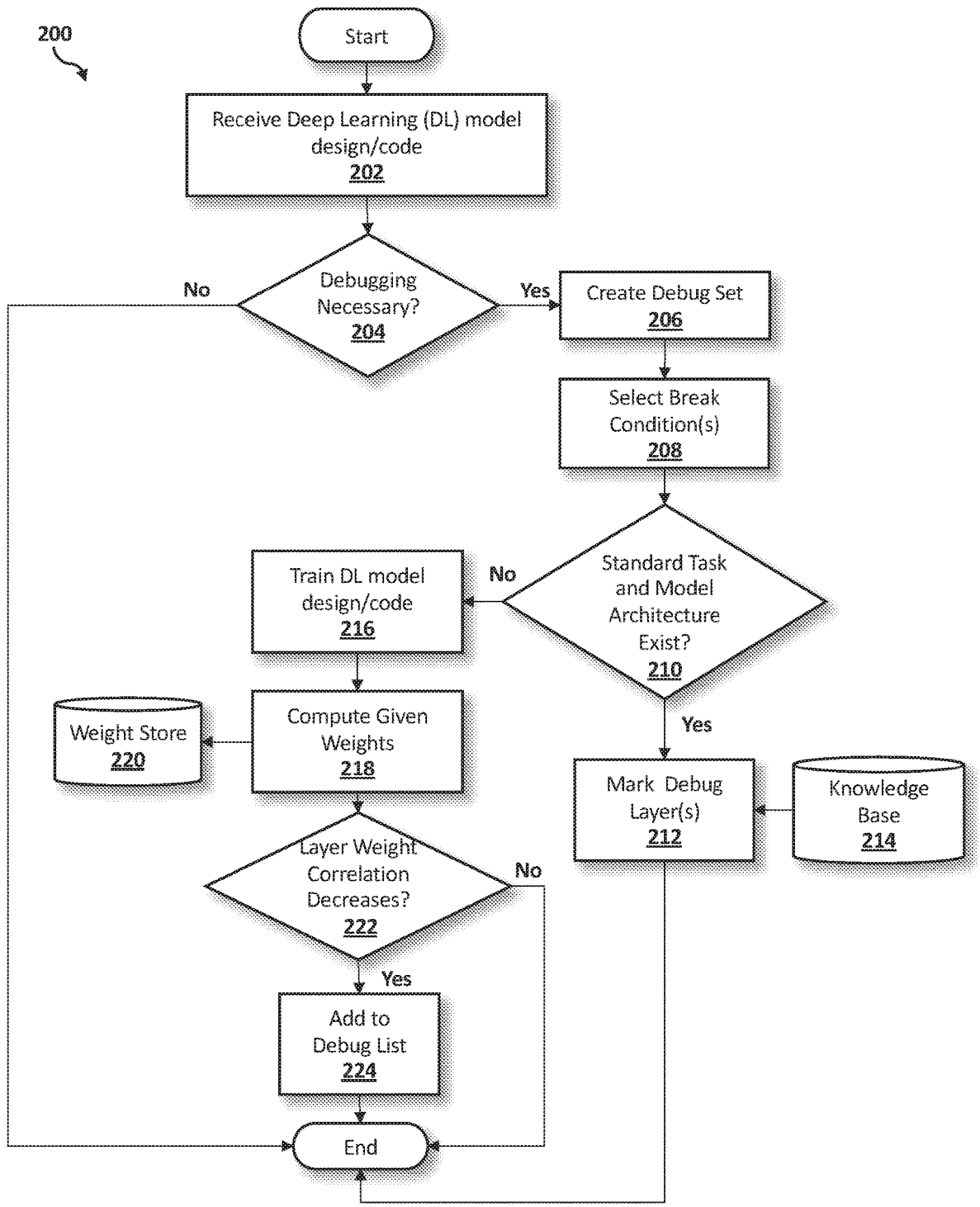
FIG. 2 is an operational flowchart illustrating a process for an exemplary DNN debugging process 200 according to at least one embodiment.

Referring now to FIG. 2, an operational flowchart illustrating the exemplary DNN debugging process 200 used by the DNN debugging program 110a, 110b according to at least one embodiment is depicted.

At 202, a deep learning model design/code is received. Utilizing a software program 108 on the user's device (e.g., user's computer 102), the deep learning (DL) model design/code is received as input, via the communications network 116, into the DNN debugging program 110a, 110b. The DL model design/code may include a visual design for a neural network modeler, or a plain source code. The DL model design/code may be fully implemented by a user and without errors.

In addition to the DL model/code, training data (e.g., Modified National Institute of Standards and Technology database (MNIST), Canadian Institute For Advanced Research (CIFAR-10 dataset)) may simultaneously be received as input, via the communications network 116, into the DNN debugging program 110a, 110b.

For example, User A uploads DL Model Code A into the DNN debugging program 110a, 110b, along with a training data from the MNIST database.

Next, at 204, the DNN debugging program 110a, 110b determines if the received DL model design/code may be debugged. Prior to receiving the DL model design/code, a global debug flag may be included in the DL model design/code by the user. The DNN debugging program 110a, 110b may automatically search for user-specified debug points (e.g., interpreted by the DNN debugging program 110a, 110b as potential watchpoints) utilizing standard debug points enablers (e.g., 'sys.breakpointhook( ),' 'pdb.set_trace( )' in Python programming language) to parse through the DL model design/code for the global debug flag and identify whether the previously set global debug flag is present. The presence of the global debug flag may indicate that debugging is recommended for the DL model design/code.

If the DNN debugging program 110a, 110b determines that the received DL model design/code should not be debugged at 204, then the DNN debugging program 110a, 110b will determine that the DL model design/code should proceed with training without utilizing the DNN debugging program 110a, 110b. After the DNN debugging program 110a, 110b parses through the DL model design/code for the global debug flag, the DNN debugging program 110a, 110b may be unable to identify the global debug flag. Due to the absence of the global debug flag, the DNN debugging program 110a, 110b may determine that debugging is not recommended for the DL model design/code. As such, the DL model design/code may proceed with a normal training process without any debugging.

Continuing the previous example, if the DNN debugging program 110a, 110b searched through DL Model Code A and was unable to identify any global debug flags, then the DNN debugging program 110a, 110b would determine that DL Model Code A should not be debugged. Therefore, the DNN debugging process 200 would conclude for the newly received DL Model Code A.

If, however, the DNN debugging program 110a, 110b determines that the received DL model design/code should be debugged at 204, then the DNN debugging program 110a, 110b creates a debug set at 206. By utilizing the user-specified debug points, the DNN debugging program 110a, 110b may search through the DL model design/code and may identify a global debug flag that was previously set by the user. Therefore, the received DL model design/code may proceed with debugging. During the DNN debugging process 200, the DNN debugging program 110a, 110b may first create a debug set, which may be utilized to simulate an ideal scenario so that the received DL model design/code may perfectly learn (i.e., without error and delay) an intended task. The DNN debugging program 110a, 110b may then automatically, by performing various techniques (e.g., random partitioning, clustering), split the received training set associated with the DL model design/code into a new smaller training set and a debug set.

In at least one embodiment, prior to creating a debug set, the DNN debugging program 110a, 110b may first confirm whether the "Debug Mode" is turned "on," activated or in an active state. If the "Debug Mode" is not turned "on," then the DNN debugging program 110a, 110b may not proceed with the DNN debugging process 200.

In at least one embodiment, the DNN debugging program 110a, 110b may utilize heuristics (i.e., utilizes past experiences in which a smaller training set and debug set was determined from previous DL model designs/codes, and compares any newly received DL model design/code to the previously received DL model designs/codes with the corresponding smaller training set and debug set, and through the process of common sense and comparisons determines the probable smaller training set and debug set for the current DL model design/code) to sample a representative subset of the training data for the DL model design/code.

In at least one embodiment, the DNN debugging program 110a, 110b may notify (e.g., via dialog box) the user that the global debug flag has been identified in the received DL model design/code. The user may be further prompted, for example, by a question, "should debugging proceed automatically?" at the bottom of the dialog box with a "Yes" button and "No" button located underneath the question. If the user clicks the "Yes" button, the DNN debugging program 110a, 110b may proceed with automatically splitting the training data and creating the debug set. If, however, the user clicks the "No" button, then the user will be further instructed on how to split the training data and create the smaller training set and debug set, and how to select break conditions.

Continuing the previous example, the DL Model Code A includes 'pdb.set_trace( )' as a standard debug points enabler throughout the code. The DNN debugging program 110a, 110b searches through DL Model Code A and identifies multiple global debug flags. As such, the DNN debugging program 110a, 110b determines that DL Model Code A should be debugged. The DNN debugging program 110a, 110b then further determines that the "Debug Mode" is turned "on." The DNN debugging program 110a, 110b then utilizes random partitioning to split the received training data from a random data point selection of the MNIST dataset into a debug set and a smaller training set.

Then, at 208, the break condition(s) are selected. The DNN debugging program 110a, 110b may then automatically select random break conditions previously defined by the user (e.g., validation accuracy less than 80%) for the corresponding received DL model design/code. A set of rules (e.g., a like break after every epoch) may be previously built into the DNN debugging program 110a, 110b that may be associated with the auto-selection of break conditions. The selected break conditions may be utilized to instruct the DNN debugging program 110a, 110b, when the debug output may be presented to the user. In the present embodiment, there may be no limitations on the break conditions.

Additionally, the break conditions may be user input in which the user is given the capability to debug or monitor various conditions (e.g., a drift in validation accuracy <K threshold), or the user may start to monitor layers after the epochs (e.g., M epochs). The corresponding reverse layers (e.g., to interpret and/or debug) for most layers may be derived from literature with simple look-up tables that the DNN debugging program 110a, 110b may automatically fit in whenever the debug points are placed for a particular layer.

In at least one embodiment, the DNN debugging program 110a, 110b may utilize heuristics (i.e., utilizes past experiences in which break conditions were selected from previous DL model designs/codes, and compares any newly received DL model design/code to the previously received DL model designs/codes with the corresponding break conditions, and through the process of common sense and comparisons determines the probable break conditions for the current DL model design/code) to sample a representative subset of the break conditions for the DL model design/code.

In at least one embodiment, the user may manually select break conditions for the received DL model design/code based on the user's understanding of the DL and the layers in which debugging may be recommended. After the user is notified by the DNN debugging program 110a, 110b that the global debug flag has been identified in the received DL model design/code, and the user clicks, for example, the "No" button when prompted, via the dialog box, whether the debugging should proceed automatically, the instructions provided by the DNN debugging program 110a, 110b may include instructions on how to select corresponding break conditions for the received DL model design/code.

In at least one embodiment, if the user decides to debug the DL model design/code in which break conditions are absent, then the DNN debugging program 110a, 110b may select or add debug points by taking the break conditions from the user.

In some embodiments, if the break condition is absent, then the user may write a design/code for the break condition (i.e., break condition design/code) and add the break condition design/code to the DL model design/code. The DNN debugging program 110a, 110b may then place a debug point on learned task specific layers.

Continuing the previous example, the user previously defined the break conditions as validation accuracy greater than 95%. As such, the DNN debugging program 110a, 110b selects the previously user-defined break condition for the DL Model Code A.

Then, at 210, the DNN debugging program 110a, 110b determines if a standard task and model architecture exist. The DNN debugging program 110a, 110b may utilize a software program 108 on the user device (e.g., user computer 102) to compare the architecture and/or intended task of the DL model design/code with previously determined standard model and/or architecture to determine whether a standard architecture and/or task exists with the received DL model design/code. For a DL model design/code with a standard architecture and/or task, the specific neural network layers recommended for debugging may be already known and selected based on pre-defined heuristics. As such, the DNN debugging program 110a, 110b may experience less difficulty in debugging the DL model design/code. In an image classification, for example, the DNN debugging program 110a, 110b may determine that the DL model design/code architecture are standard, and the DNN debugging program 110a, 110b, based on previous training data, may easily determine that the higher convolutional layers may learn abstract shapes, and therefore, may have to be debugged rather than the lower layers that learn basic shapes, such as lines and edges.

Based on previous training data, the DNN debugging program 110a, 110b may periodically build or update the heuristics utilized to select the debug layer(s) for the standard DL model design/code architecture and task.

If the DNN debugging program 110a, 110b determines that a standard model architecture and task exists at 210, then the DNN debugging program 110a, 110b utilizes the knowledge base 214 to mark the debug layer(s) at 212. Based on training data derived from previous standard model architectures with standard tasks and the corresponding layers, the knowledge base 214 may include (i) a list of standard model architectures for standard tasks (e.g., image classification, language modeling), and (ii) for each standard model architecture for standard tasks (i.e., standard task-architectural combinations), a corresponding list of layers that may be marked for debugging. When such standard task-architectural combinations are received as input in the DNN debugging program 110a, 110b, the DNN debugging program 110a, 110b may automatically mark the correct layers for debugging based on the lists included within the knowledge base 214. By marking the debug layer(s), the user may identify one or more layers that are hindering the learning (or training) process of the received DL model design/code. Therefore, the DNN debugging program 110a, 110b may apply a fix for these layers and/or provide actionable insight(s) to the user.

Continuing the previous example, if the DNN debugging program 110a, 110b utilizes the software program 108 to compare the DL Model Code A with previously analyzed DL model design/codes with standard architecture and/or intended task, and determines that the DL Model Code A includes a standard architecture and task, such as image classification, then the DNN debugging program 110a, 110b will defer to the knowledge base 214 to identify the debug layers.

If, however, the DNN debugging program 110a, 110b determines that no standard task and/or model architecture exists at 210, then the DNN debugging program 110a, 110b trains the DL model design/code at 216. For non-standard tasks and/or model architecture associated with a received DL model design/code, the DNN debugging program 110a, 110b may experience difficulty identifying the layers to debug on the received DL model design/code based on the previous training data associated with the architecture and task and pre-defined heuristics (e.g., past experience as the dataset, network, or both). Therefore, the DNN debugging program 110a, 110b may use two datasets: (1) the created debug set (M1); and (2) the smaller training set (M2) to train the received DL model design/code. The DNN debugging program 110a, 110b may separate the created debug set (M1) from the training set (M2) to avoid overfitting of the DL model design/code thereby leading to higher accuracy in the training of the received DL model design/code.

Continuing the previous example, the DNN debugging program 110a, 110b determines, based on the findings from the software program 108, that the DL Model Code A includes a non-standard task and/or model architecture. Therefore, the DNN debugging program 110a, 110b utilizes both the created debug set and smaller training set to train DL Model Code A and identify the debug layers for the DL Model Code A.

Then, at 218, the given weights are computed. By applying machine learning (ML) algorithms (e.g., gradient descent, RMSProp optimizer, Adam, Stochastic), the DNN debugging program 110a, 110b may compute the weights associated with each debug layer of the received DL model design/code from the two datasets (i.e., created debug set (M1) and the smaller training set (M2)). By utilizing a gradient descent rule, for example, the set of values for the model parameters associated with each of the datasets are separately computed to minimize a given function to the local minimum based on a convex function. The output may be two sets of given weights based on either the created debug set, or the smaller training set.

Additionally, the DNN debugging program 110a, 110b may then store the computed sets of weights associated with created debug set and the smaller training set to a weight store 220 (e.g., database 114) with the corresponding DL model design/code and intended task.

In at least one embodiment, the weight store may be a snapshot in which the computed weights are stored until the debugging of the layer is completed. Therefore, the user may load the DL model design/code with these snapshots and continue training the DL model design/code.

In at least one embodiment, based on an algorithm (e.g., MODE algorithm), the DNN debugging program 110a, 110b may set the debug points over time. In the DL, there may be a stop and play facility, where the DL model and the corresponding weights may be saved and loaded to continue to run for more epochs (runs) based on any user-specified constraints or determinations (e.g., break conditions after a certain amount of epochs, lower threshold for validation accuracy).

Continuing the previous example, the DL Model Code A includes three layers: Layers 1, 2 and 3. The DNN debugging program 110a, 110b then analyzes each layer of the DL Model Code A separately. First, the DNN debugging program 110a, 110b utilizes a gradient descent rule to compute the following given weights for a created debug set associated with DL Model Code A (i.e., Debug Set A) and a smaller training set associated with DL Model Code A (Smaller Training Set A):
Layer 1: Debug Set A (M1A)=0.49; Smaller Training Set A (M2A)=0.31
Layer 2: Debug Set A (M1A)=0.29; Smaller Training Set A (M2A)=0.54
Layer 3: Debug Set A (M1A)=0.77; Smaller Training Set A (M2A)=0.48
The computed given weights for each set in each layer is then saved in the weight store 220 until the layer weight correlation is determined. After which, the corresponding given weight for each set in each layer is permanently deleted from the weight store and only findings marking the debug layers are retained by the knowledge base 214 of the DNN debugging program 110a, 110b.

Then, at 222, the DNN debugging program 110a, 110b determines whether the layer weight correlation decreases. By utilizing algorithms that compute correlations (e.g., relatedness) between values from complex datasets (e.g., Pearson's Correlation Coefficient, Kullback-Leibler (KL) divergence, mutual information, distance correlation, maximal information coefficient), the DNN debugging program 110a, 110b may perform a correlation analysis between the weights associated with each layer of M1 (i.e., first set of given weights) and the corresponding weights associated with each layer of M2 (i.e., second set of given weights) to determine whether the weights associated with each layer decrease. The algorithms may then compute a layer weight correlation value for each set of given weights (i.e., first layer weight correlation value associated with the first set of given weights, and a second layer weight correlation value associated with the second set of given weights). The two layer weight correlation values may then be compared to determine the difference between M1 and M2 for each layer. The DNN debugging program 110a, 110b may then determine if the layer weight correlation value decreases from M1 to M2 (e.g., the layer weight was 0.3 at M1 and then 0.19 at M2), then the layer weight correlation (i.e., comparison between the two sets of layer weight correlation values, or overall/combined layer weight correlation value associated with the layer) will decrease.

In at least one embodiment, the DNN debugging program 110a, 110b may determine whether the layer weight correlation is low by comparing the average layer weight correlation values of both M1 and M2 (e.g., compute the average of both M1 and M2, by adding the values associated with each and dividing by two) to a previously determined threshold (e.g., default 0.5 in a 0 to 1 range, 5 in a 0 to 10 range, 50 in a 0 to 100 range, or the median in some form of normalized range). If the average layer weight correlation value is less than the threshold, then the layer weight correlation may be identified as low. If, however, the average layer weight correlation value is equal to or higher than the threshold, then the layer weight correlation may be identified as high.

In at least one embodiment, the DNN debugging program 110a, 110b may utilize the median of the layer weight correlation values each of both M1 and M2 to determine the combined layer weight correlation value for both M1 and M2. The combined layer weight correlation may then be compared to the threshold to determine whether the layer weight correlation is low or high.

If the DNN debugging program 110a, 110b determines the layer weight correlation does not decrease (i.e., increases or is equal to) at 222, then the DNN debugging program 110a, 110b concludes. An increase or high layer weight correlation may indicate that the layer corresponding with the weights from each dataset (M1 and M2) is performing as expected and no debugging is recommended for that particular layer of the DL model design/code.

Additionally, an equal layer weight correlation may indicate that the layer corresponding with the weights from each dataset (M1 and M2) is performing as expected and no debugging is recommended for that particular layer of the DL model design/code.

Continuing the previous example, the DNN debugging program 110a, 110b determines the layer weight correlation by comparing the $M1_A$ to $M2_A$ and then determining whether the given weight increases or the given weight is equal from $M1_A$ to $M2_A$. As such, Layer 2 (Debug Set A ($M1_A$)=0.29; Smaller Training Set A ($M2_A$)=0.54) has an increase in the layer weight correlation, and therefore, the DNN debugging program 110a, 110b will determine that debugging is not recommended for Layer 2.

If, however, the DNN debugging program 110a, 110b determines the layer weight correlation decreases at 222, then the corresponding layer of the DL model design/code is added to a debug list at 224. If there is no correlation between layer weights, or the correlation between the layer weights is low or decreases, then the corresponding layer to the layer weight is added to the debug list. The debug list may be complied or generated by the DNN debugging program 110a, 110b, and may include a catalog (e.g., represented by a consecutive list of associated items, table, graph) that describes the layers to be debugged. The debug list may include a name or number to identify the layer, and any associated information of the layer (e.g., layer weight correlation values, description of what occurs in that layer, data associated with the debug set and/or smaller training set).

Additionally, the DNN debugging program 110a, 110b may then mark the corresponding layer as "to be debugged" (i.e., debug point) for the appropriate debug block to be attached (or connected) to the corresponding layer. As such, the debug points may indicate when the debugging should be performed. The debug points may be found based on the break conditions which may be defined using different parameters (e.g., validation accuracy, number of epochs). The DNN debugging program 110a, 110b may then present an output (e.g., a debug list, DL model design/code with debug blocks) to the user based on the determined break conditions. For example, in a DL model code, the output for the textual data includes a red-colored text to indicate a high attention value in which useful information is interpreted from each segment, such as the sensitivity to position in a line, text inside quotes and comments/quotes in the textual data of the DL model code. In another example, in a DL model design, the DNN debugging program 110a, 110b received an input image of a bicycle, and other images generated by the neural network indicate what various filters in a layer determine as recommended features of the image to classify the image as a bicycle. Based on most filters, the output shows that the tires are seen as the recommended feature of the bicycle.

When the DNN debugging program 110a, 110b determines that the selected break condition(s) are met, the debugging results may be shown to the user. When an epoch breakpoint, or validation accuracy, is satisfied, the DNN debugging program 110a, 110b may be triggered to present the debug output to the user. The debug output may also include a fix to be applied to the debug layers (i.e., debug point(s)), and/or actionable insights to the user which the user may implement to fix the identified debug point(s).

The DNN debugging program 110a, 110b may, for example, present the option of adding a dropout layer between layers A and B to improve regularization, or decay the learning rate after "e" epochs for further decreases in loss as actionable insights to the identified debug points.

Continuing the previous example, the DNN debugging program 110a, 110b determines the layer weight correlation by comparing $M1_A$ to $M2_A$ and then determining whether the given weights decreases from $M1_A$ to $M2_A$. As such, Layer 1 (Debug Set A ($M1_A$)=0.49; Smaller Training Set A ($M2_A$)= 0.31) and Layer 3 (Debug Set A ($M1_A$)=0.77; Smaller Training Set A ($M2_A$)=0.48) decrease and therefore, the DNN debugging program 110a, 110b will add Layers 1 and 3 to the debug list. In addition Layers 1 and 3 will be marked as "to be debugged" and Debug Blocks $A_1$ and $A_3$ will be attached to the layers respectively.

In another embodiment, the correlation between layer weights, when the DL model design/code is trained on only the debug set (i.e., there is no smaller training set from the training dataset), and layer weights, when the DL model design/code is trained on a larger training set is low, then the corresponding layer is added to the debug list.

In at least one embodiment, the DNN debugging program 110a, 110b may temporarily store the corresponding layer marked as "to be debugged" (i.e., debug point) and the entry of the corresponding layer on the debug list in a debugging database (e.g., database 114) until the corresponding layer is fully debugged by an associated software program 108 or application program interface (API). Then, the associated software program 108 (or API) may delete the corresponding layer and the entry of that corresponding layer on the debug list.

In some embodiments, the DNN debugging program 110a, 110b does not store the corresponding layer marked as "to be debugged" (i.e., debug point) and the entry of the corresponding layer on the debug list. Instead, the "to be debugged" marking on the corresponding layer may be the only identifier for the user to determine which layers in the DL model design/code have to be fixed.

In the present embodiment, the appropriate debug blocks may depend on the debug point. In at least one embodiment, for a convolution neural network (CNN), a deconvolution debug block to transpose the convolution layer may be utilized to filter the visualizations. In another embodiment, for a dense neural network, the inputs may have to be reconstructed by utilizing a type of artificial neural network to learn efficient data codings in an unsupervised manner, which is similar to an autoencoder. In some embodiments, for a recurrent neural network (RNN), hidden Markov Models may be utilized.

In the present embodiment, the user may, at any point in the DNN debugging process 200, have the option of turning the debugging mode "on" (i.e., active mode) or "off" (i.e., inactive mode). As such, the user may determine whether to identify layer(s) that are hindering the learning process of the DL model design/code, or not. For example, at the bottom of the screen, there is a "Change Debug Mode" button. If the user clicks the "Change Debug Mode" button, then the DNN debugging program 110a, 110b will prompt the user, via a dialog box, to confirm if the user intends to end the DNN debugging program 110a, 110b, with a "Yes" or "End" button or a "No" or "Cancel" button located at the bottom of the dialog box. If the user selects the "Yes" or "End" button, then the DNN debugging program 110a, 110b notifies the user that the DNN debugging process 200 has been terminated and the DNN debugging program 110a, 110b has been turned to "off". If, however, the user clicks the "No" or "Cancel" button, then DNN debugging program 110a, 110b may proceed with the DNN debugging process 200. In at least one embodiment, once the user clicks the "Change Debug Mode" button, any current DNN debugging process 200 may be temporarily suspended and the DNN debugging program 110a, 110b may be paused until the user confirms whether to change the debug mode. As such, if the DNN debugging program 110a, 110b is currently turn "on" and in the process of identifying one or more layers for debugging, then this current DNN debugging process 200 is suspended and the DNN debugging program 110a, 110b is paused until the user confirms whether to proceed or turn "off" the DNN debugging program 110a, 110b. If, however, the DNN debugging program 110a, 110b is currently turned "off" when the user clicks the "Change Debug Mode" button, then there is no current DNN debugging process 200 to suspend. As such, if the user selects to turn "on" the DNN debugging program 110a, 110b, then the DNN debugging program 110a, 110b will start by receiving a new DL model design/code.

In the present embodiment, if the user turns "off" the DNN debugging program 110a, 110b, while the DNN debugging program 110a, 110b is currently identifying one or more layers to debug in the received DL model design/code, the DNN debugging program 110a, 110b may end the DNN debugging process 200 at that point, and may present the one or more layers identified at that point to the user. No further analysis of the other layers associated with the DL model design/code may be performed until the user turns "on" the DNN debugging program 110a, 110b.

In another embodiment, if the user confirms to turn "off" the DNN debugging program 110a, 110b, while the DNN debugging program 110a, 110b is currently identifying one or more layers to debug in the received DL model design/code, the DNN debugging program 110a, 110b may prompt the user with a status update (e.g., percentage of completion, amount of time recommended for completion, recommendation on whether the DNN debugging program 110a, 110b should continue the analysis) on the currently analyzed DL model design/code. The user may then be prompted (e.g., via dialog box) to indicate whether the user wants the DNN debugging program 110a, 110b to continue the analysis of the currently analyzed DL model design/code, and then change debug mode, or to end the DNN debugging process 200 at this point. If the user decides to end the DNN debugging process 200 at the current point, then the user may be once again prompted (e.g., via dialog box) to either save the currently analyzed DL model design/code for completion at a later date, or end without saving the currently analyzed DL model design/code.

In the present embodiment, the DNN debugging program 110a, 110b may consider user feedback when identifying the debug layer(s) and debug point(s), and how to split the training set to create the debug set. The user feedback may be implemented to improve the debugging of the training process associated with the DNN debugging program 110a, 110b. Therefore, the DNN debugging program 110a, 110b may able to improve the accuracy of the automatic identification of debug layer(s) and debug point(s).

The functionality of a computer may be improved by the DNN debugging program 110a, 110b because the DNN debugging program 110a, 110b may provide a higher level of debugging with minimal, if any, errors. The DNN debugging program 110a, 110b may automatically determine and introduce one or more reverse operation layers for debugging, automatically identify debug layers (or debug points), automatically create a debug set by considering the nature of the network and/or dataset, and automatically identify suitable debug points. The DNN debugging program 110a, 110b may further provide actionable insights (e.g., suitable debug layers) to the user based on the debug points results. The user may also filter or tailor the debug points results. The DNN debugging program 110a, 110b may also minimize, if not eliminate, any errors that may occur with human intervention when identifying errors for debugging.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
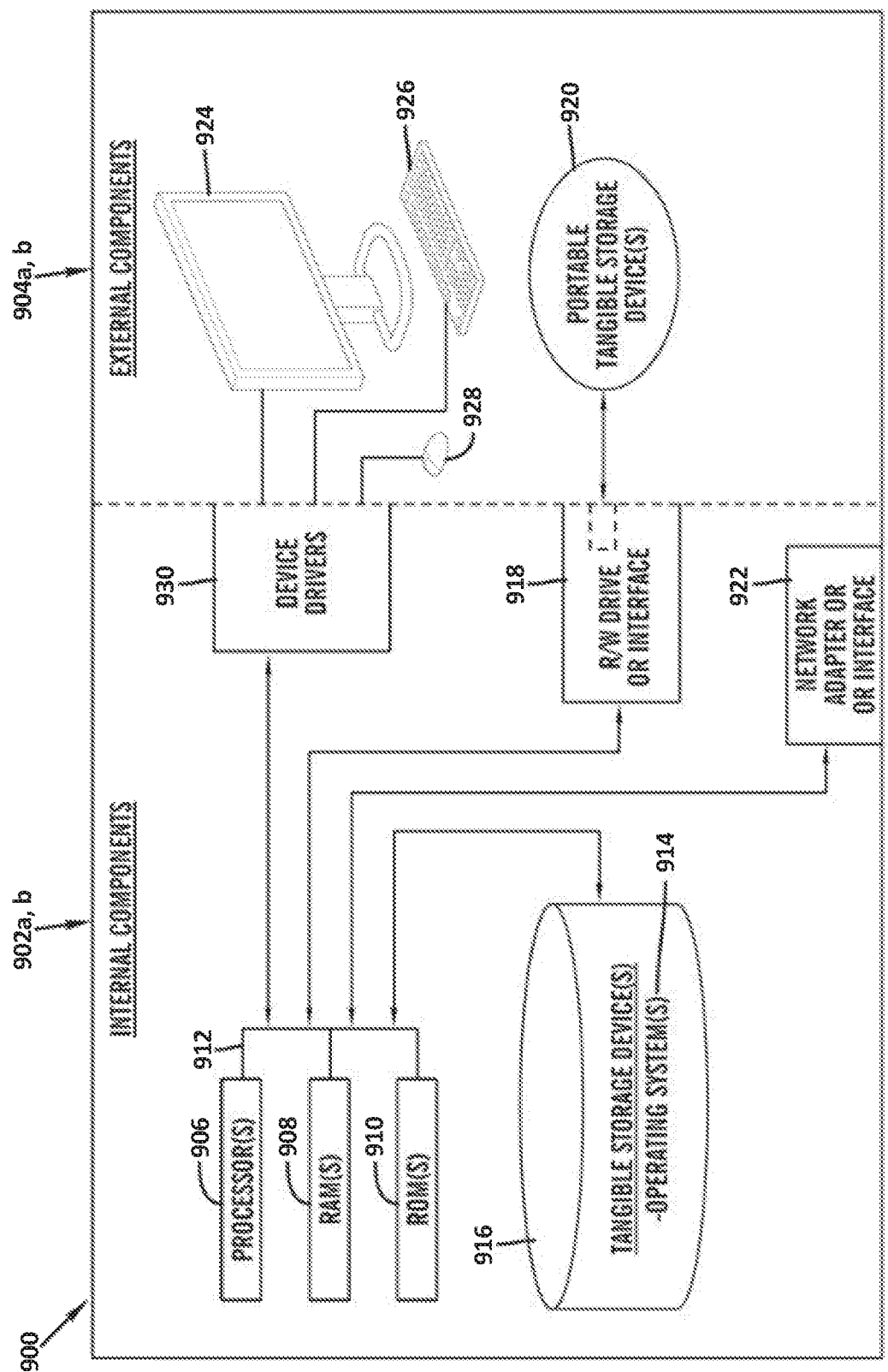
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the DNN debugging program 110a in client computer 102, and the DNN debugging program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the DNN debugging program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the DNN debugging program 110a in client computer 102 and the DNN debugging program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the DNN debugging program 110a in client computer 102 and the DNN debugging program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
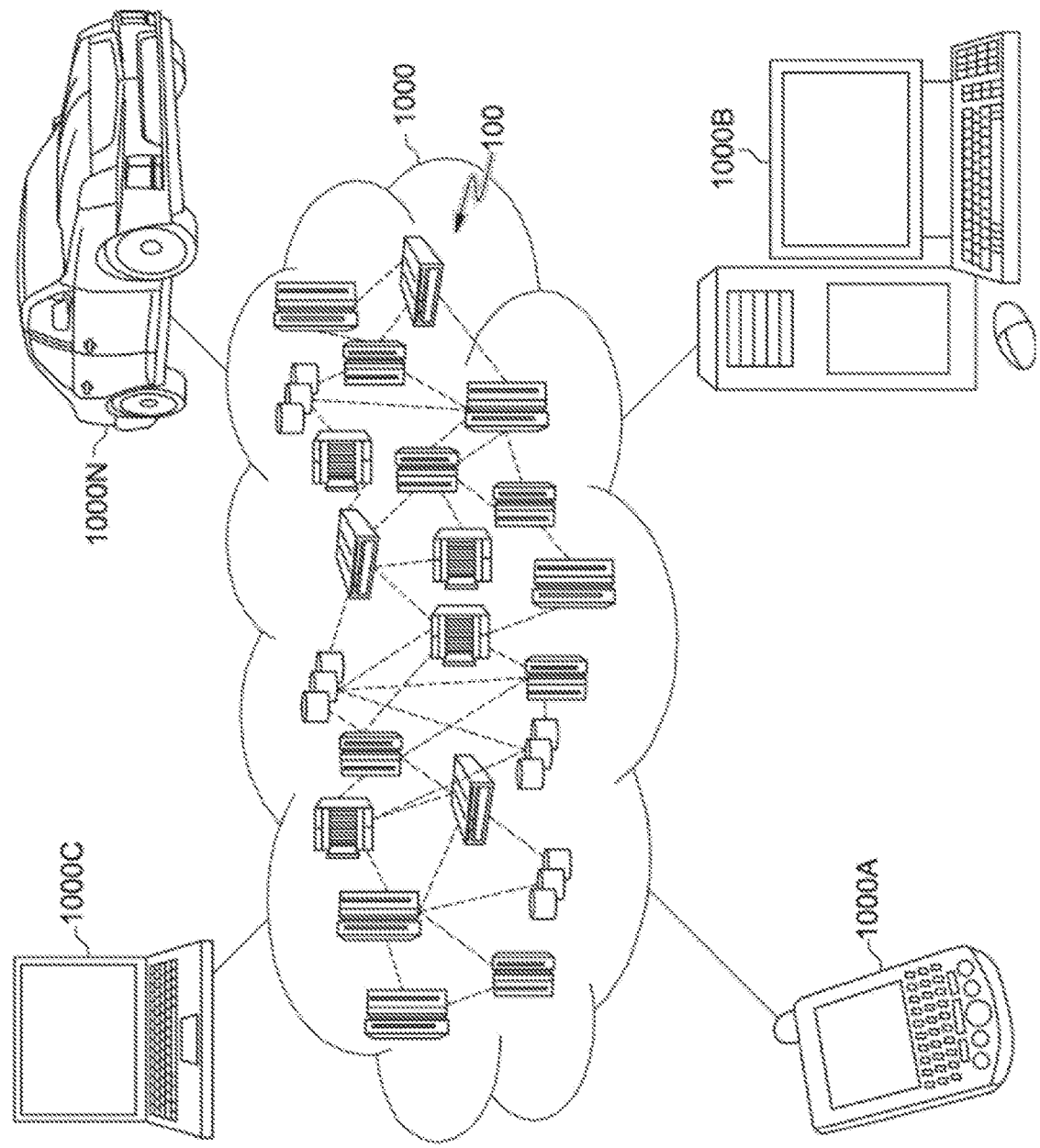
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
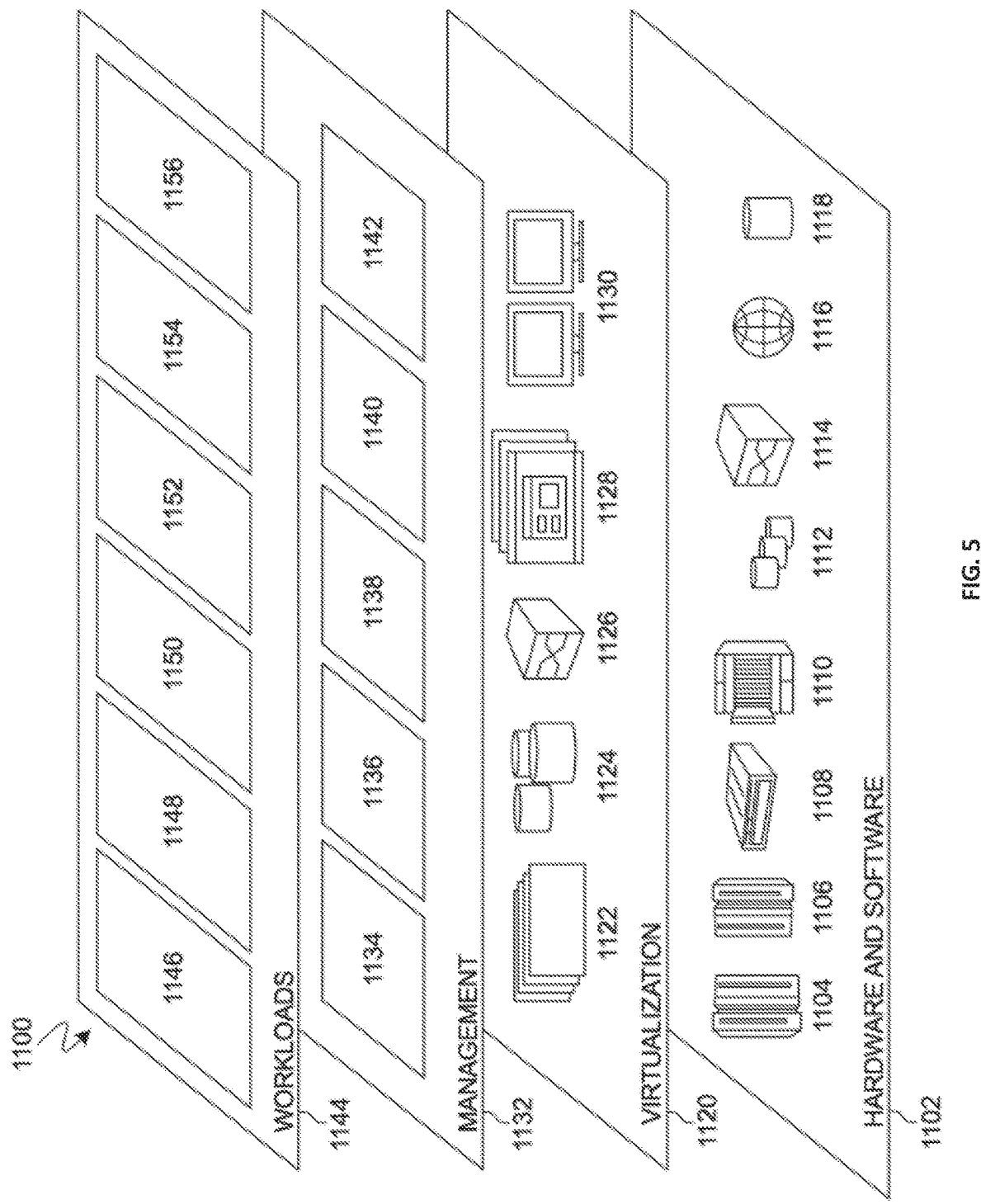
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124;

virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and DNN debugging 1156. A DNN debugging program 110a, 110b provides a way to debug a deep neural network prior to commencing the training process.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
identifying, automatically, one or more debug layers associated with a deep learning (DL) model, and wherein identifying the one or more debug layers further comprises identifying the one or more debug layers for debugging based on a determination of whether a standard task and standard model architecture is associated with the DL model and whether a non-standard task and non-standard architecture is associated with the DL model,
   wherein the identified one or more debug layers include one or more errors,
   wherein a reverse operation is introduced for the identified one or more debug layers; and
presenting, to a user, a debug output based on at least one break condition,
   wherein in response to determining the at least one break condition is satisfied, triggering the debug output to be presented to the user,
   wherein the presented debug output includes a fix for the identified one or more debug layers in the DL model and at least one actionable insight.

2. The method of claim 1, wherein identifying, automatically, the one or more layers in the deep learning (DL) model for debugging, further comprises:
receiving the DL model and a training data associated with the received DL model design/code;
searching the received DL model for one or more global debug flags;
identifying the one or more global debug flags in the received DL model,
   wherein the presence of the identified one or more global debug flags indicates the received DL model should commence debugging;
in response to determining debugging is recommended for the received DL model, creating a debug set and a training set from a subset of the received training data; and
selecting the at least one break condition for the received DL model,
   wherein the selected at least one break condition determines a debug output presented to the user.

3. The method of claim 2, further comprising:
in response to determining the standard task and the standard model architecture exists, automatically marking the identified one or more debug layers for debugging based on a knowledge base,
   wherein the knowledge base includes a plurality of previous training data associated with previously trained standard model architectures with standard tasks,
   wherein each previously trained standard model architecture includes a list of previously identified debug layers with a debug mark.

4. The method of claim 3, further comprising:
in response to determining the non-standard task and the non-standard model architecture is associated with the received DL model, training the received DL model based on the created debug set and the training set associated with the subset of the received training data;
computing two sets of given weight associated with each debug layer from the marked one or more debug layers of the trained DL model,
   wherein a first set of the computed given weight is associated with the created debug set for each debug layer from the marked one or more debug layers of the trained DL model, and a second set of the computed given weight is associated with the smaller training set for each debug layer from the marked one or more debug layers of the trained DL model; and
storing the computed two sets of given weight associated with each debug layer from the marked one or more debug layers of the trained DL model in a weight store.

5. The method of claim 4, further comprising:
computing a layer weight correlation associated with each debug layer of the trained DL model,
   wherein a first layer weight correlation value is computed for the first set of the computed given weights associated with the created debug set for each debug layer of the trained DL model, and a second layer weight correlation value is computed for the second set of the computed given weights associated with the training set for each debug layer of the trained DL model,
   wherein the first layer weight correlation value and a second layer weight correlation are compared to determine whether the layer weight correlation decreases from the computed first layer weight correlation value to the computed second layer weight correlation value.

6. The method of claim 5, further comprising:
in response to determining that the layer weight correlation associated with each debug layer from the marked one or more debug layers of the trained DL model decreases, adding each debug layer associated with the decreased layer weight correlation to a debug list;
adding a debug mark to the each added debug layer on the debug list; and
connecting a debug block to each added debug layer based on the added debug mark.

7. The method of claim 6, wherein the debug list includes an identifier for each debug layer from the marked one or more debug layers, and a set of data associated with each debug layer from the marked one or more debug layers.

8. A computer system for debugging a deep neural network, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
identifying, automatically, one or more debug layers associated with a deep learning (DL) model, and wherein identifying the one or more debug layers further comprises identifying the one or more debug layers for debugging based on a determination of whether a standard task and standard model architecture is associated with the DL model and whether a non-standard task and non-standard architecture is associated with the DL model,
wherein the identified one or more debug layers include one or more errors,
wherein a reverse operation is introduced for the identified one or more debug layers; and
presenting, to a user, a debug output based on at least one break condition,
wherein in response to determining the at least one break condition is satisfied, triggering the debug output to be presented to the user,
wherein the presented debug output includes a fix for the identified one or more debug layers in the DL model and at least one actionable insight.

9. The computer system of claim 8, wherein identifying, automatically, the one or more layers in the deep learning (DL) model for debugging, further comprises:
receiving the DL model and a training data associated with the received DL model;
searching the received DL model for one or more global debug flags;
identifying the one or more global debug flags in the received DL model,
wherein the presence of the identified one or more global debug flags indicates the received DL model should commence debugging;
in response to determining debugging is recommended for the received DL model, creating a debug set and a training set from a subset of the received training data; and
selecting the at least one break condition for the received DL model,
wherein the selected at least one break condition determines a debug output presented to the user.

10. The computer system of claim 9, further comprising:
in response to determining the standard task and the standard model architecture exists, automatically marking the identified one or more debug layers for debugging based on a knowledge base,
wherein the knowledge base includes a plurality of previous training data associated with previously trained standard model architectures with standard tasks,
wherein each previously trained standard model architecture includes a list of previously identified debug layers with a debug mark.

11. The computer system of claim 10, further comprising:
in response to determining the non-standard task and the non-standard model architecture is associated with the received DL model, training the received DL model based on the created debug set and the training set associated with the subset of the received training data;
computing two sets of given weight associated with each debug layer from the marked one or more debug layers of the trained DL model,
wherein a first set of the computed given weight is associated with the created debug set for each debug layer from the marked one or more debug layers of the trained DL model, and a second set of the computed given weight is associated with the training set for each debug layer from the marked one or more debug layers of the trained DL model; and
storing the computed two sets of given weight associated with each debug layer from the marked one or more debug layers of the trained DL model in a weight store.

12. The computer system of claim 11, further comprising:
computing a layer weight correlation associated with each debug layer of the trained DL model,
wherein a first layer weight correlation value is computed for the first set of the computed given weights associated with the created debug set for each debug layer of the trained DL model, and a second layer weight correlation value is computed for the second set of the computed given weights associated with the training set for each debug layer of the trained DL model,
wherein the first layer weight correlation value and a second layer weight correlation are compared to determine whether the layer weight correlation decreases from the computed first layer weight correlation value to the computed second layer weight correlation value.

13. The computer system of claim 12, further comprising:
in response to determining that the layer weight correlation associated with each debug layer from the marked one or more debug layers of the trained DL model decreases, adding each debug layer associated with the decreased layer weight correlation to a debug list;
adding a debug mark to the each added debug layer on the debug list; and
connecting a debug block to each added debug layer based on the added debug mark.

14. The computer system of claim 13, wherein the debug list includes an identifier for each debug layer from the marked one or more debug layers, and a set of data associated with each debug layer from the marked one or more debug layers.

15. A computer program product for debugging a deep neural network, the computer program product comprising a computer-readable storage medium having program instructions embodied therewith, wherein the computer readable storage medium is not transitory signal per se, the program instructions executable by a processor to cause the processor to perform a method comprising:

identifying, automatically, one or more debug layers associated with a deep learning (DL) model, and wherein identifying the one or more debug layers further comprises identifying the one or more debug layers for debugging based on a determination of whether a standard task and standard model architecture is associated with the DL model and whether a non-standard task and non-standard architecture is associated with the DL model, wherein the identified one or more debug layers include one or more errors, wherein a reverse operation is introduced for the identified one or more debug layers; and presenting, to a user, a debug output based on at least one break condition, wherein in response to determining the at least one break condition is satisfied, triggering the debug output to be presented to the user, wherein the presented debug output includes a fix for the identified one or more debug layers in the DL model and at least one actionable insight.

16. The computer program product of claim 15, wherein identifying, automatically, the one or more layers in the deep learning (DL) model for debugging, further comprises:

receiving the DL model and a training data associated with the received DL model;

searching the received DL model for one or more global debug flags;

identifying the one or more global debug flags in the received DL model, wherein the presence of the identified one or more global debug flags indicates the received DL model should commence debugging;

in response to determining debugging is recommended for the received DL model, creating a debug set and a training set from a subset of the received training data; and selecting the at least one break condition for the received DL model, wherein the selected at least one break condition determines a debug output presented to the user.

17. The computer program product of claim 16, further comprising:

in response to determining the standard task and the standard model architecture exists, automatically marking the identified one or more debug layers for debugging based on a knowledge base, wherein the knowledge base includes a plurality of previous training data associated with previously trained standard model architectures with standard tasks, wherein each previously trained standard model architecture includes a list of previously identified debug layers with a debug mark.

18. The computer program product of claim 17, further comprising:

in response to determining the non-standard task and the non-standard model architecture is associated with the received DL model, training the received DL model based on the created debug set and the training set associated with the subset of the received training data;

computing two sets of given weight associated with each debug layer from the marked one or more debug layers of the trained DL model, wherein a first set of the computed given weight is associated with the created debug set for each debug layer from the marked one or more debug layers of the trained DL model, and a second set of the computed given weight is associated with the training set for each debug layer from the marked one or more debug layers of the trained DL model; and storing the computed two sets of given weight associated with each debug layer from the marked one or more debug layers of the trained DL model in a weight store.

19. The computer program product of claim 18, further comprising:

computing a layer weight correlation associated with each debug layer of the trained DL model, wherein a first layer weight correlation value is computed for the first set of the computed given weights associated with the created debug set for each debug layer of the trained DL model, and a second layer weight correlation value is computed for the second set of the computed given weights associated with the training set for each debug layer of the trained DL model, wherein the first layer weight correlation value and a second layer weight correlation are compared to determine whether the layer weight correlation decreases from the computed first layer weight correlation value to the computed second layer weight correlation value.

20. The computer program product of claim 19, further comprising:

in response to determining that the layer weight correlation associated with each debug layer from the marked one or more debug layers of the trained DL model decreases, adding each debug layer associated with the decreased layer weight correlation to a debug list;

adding a debug mark to the each added debug layer on the debug list; and connecting a debug block to each added debug layer based on the added debug mark.

\* \* \* \* \*